United States Patent [19]

Wristers

[11] 4,431,569

[45] * Feb. 14, 1984

[54] TITANIUM TRICHLORIDE CATALYST COMPONENT AND THE PROCESS FOR THE PRODUCTION THEREOF

[75] Inventor: Harry J. Wristers, Baytown, Tex.

[73] Assignee: Exxon Research & Engineering Co., Florham Park, N.J.

[*] Notice: The portion of the term of this patent subsequent to Oct. 20, 1998 has been disclaimed.

[21] Appl. No.: 377,290

[22] Filed: May 12, 1982

Related U.S. Application Data

[63] Continuation of Ser. No. 102,676, Dec. 12, 1979, abandoned.

[51] Int. Cl.$^3$ .............................................. C08F 4/64
[52] U.S. Cl. ................................................. 502/154
[58] Field of Search ........................ 252/429 B, 429 C

[56] References Cited

U.S. PATENT DOCUMENTS 3,922,322 11/1975 Roger et al. ................. 252/429 B X
4,200,717 4/1980 Abe et al. ............................. 526/159
4,295,991 10/1981 Wristers ........................... 252/429 B

FOREIGN PATENT DOCUMENTS 1135697 8/1967 United Kingdom .
1202176 3/1968 United Kingdom .
1408611 10/1975 United Kingdom .
1484086 11/1976 United Kingdom .

OTHER PUBLICATIONS

Chem. Abst. 88:121933g Polyolefin Catalyst Raw Material or Component, p. 17, Citing Jap. Appln. 77142691.

*Primary Examiner*—Patrick Garvin
*Attorney, Agent, or Firm*—M. B. Kurtzman

[57] ABSTRACT

A titanium trichloride catalyst component containing a minor amount of prepolymerized alpha-olifin and useful in the polymerization of alpha-olefins is produced by reducing titanium tetrachloride with an organoaluminum compound at low temperatures and then treating the resulting reduced solids product with about 1 to 1,000 wt. % alpha-olefin so as to obtain a prepolymerized titanium trichloride reduced solid. The prepolymerized reduced solid can thereafter be activated to a highly active prepolymerized titanium trichloride by treating the prepolymerized reduced solid with a halogenated hydrocarbon and a Lewis base complexing agent or titanium tetrachloride and a Lewis base complexing agent. The prepolymerized reduced solid and the prepolymerized activated titanium trichloride manifests substantially no evidence of friability upon being subjected to mechanical shearing forces. The resulting prepolymerized activated titanium trichloride composition, when employed in combination with an organometal compound results in an unexpectedly highly active catalyst obtaining polymers with high heptane insolubles.

6 Claims, No Drawings

TITANIUM TRICHLORIDE CATALYST COMPONENT AND THE PROCESS FOR THE PRODUCTION THEREOF

This is a continuation of application Ser. No. 102,676 filed Dec. 12, 1979, and now abandoned which is a continuation U.S. Ser. No. 945,929 filed Sept. 26, 1979 and now U.S. Pat. No. 4,295,991 issued Oct. 20, 1981.

BACKGROUND OF THE INVENTION

1. Field of the Invention

This invention relates to a titanium trichloride useful as a Ziegler-type catalyst component. The invention further relates to the method of producing titanium trichloride catalyst component and a method for polymerizing alpha-olefins such as propylene to highly stereoregular polyolefins in the presence of the titanium trichloride catalyst component and a co-catalyst such as an organoaluminum compound. More particularly, the invention relates to a highly active, highly crystalline shear resistant titanium trichloride which has been prepolymerized with a small amount of alpha-olefin.

2. Discussion of the Prior Art

Pretreatment of Ziegler-type catalysts with propylene is known in the art. The pretreatment is generally performed in order to stabilize the catalyst. For example, in British Pat. No. 1,300,734 (published Dec. 20, 1972) of Shell International Research Maatschappij N.V., it is taught that by contacting a Ziegler-type catalyst comprising a titanium halide and an organoaluminum compound with a small amount of an alpha-olefin a stabilized catalyst is obtained. By "stabilization", the patent teaches that reduction of catalytic activity during polymerization reaction does not occur such that the overall activity is maintained at a high level.

In accordance with British Pat. No. 1,384,603 of Shell International Research Maatschappij N.V., there is disclosed a titanium halide aluminum trialkyl polymerization catalyst which is stabilized against deteriorating during the polymerization reaction by prepolymerizing the catalyst at a temperature below 62° C. prior to its being employed in the conventional polymerization reaction.

In the British Pat. No. 1,408,611 (published Oct. 1, 1975) of Shell International Research Maatschappij N.V. there is disclosed the preparation of a titanium trichloride catalyst component which involves reducing titanium tetrachloride to a beta-type titanium trichloride, activating the titanium trichloride to a gamma titanium trichloride and thereafter contacting the same with propene in order to form a prepolymerized catalyst component.

In U.S. Pat. No. 3,404,096 of Lamborn, issued Oct. 1, 1968, there is disclosed a method pretreating Ziegler-type catalysts with ethylene so as to form a curdy catalyst component which is useful for obtaining friable fine catalyst particles.

In U.S. Pat. No. 3,689,597 of Mahlman, issued Sept. 5, 1972, there is disclosed a method of obtaining fine polypropylene particles by polymerizing propylene in the presence of a titanium trichloride catalyst which has been pretreated with alpha-olefins.

Several methods describing the activation of titanium trichloride obtained by low temperature reduction of titanium tetrachloride with an organo-aluminum compound are described in the published patent literature. The activation is generally accomplished by contacting the reduction product of titanium tetrachloride with complexing agents and with various halogenated compounds to obtain a purple titanium trichloride which is useful as a co-catalyst with an organo-metal compound for the polymerization of alpha-olefins.

More particularly, in Japanese Patent Application (OPI) No. 34478/1972, published on Nov. 21, 1972 and corresponding to British Pat. No. 1,391,068 there is described a process which comprises treating the reduced solids obtained by low temperature reduction of titanium tetrachloride with an organoaluminum compound with a complexing agent, e.g., an ether, and titanium tetrachloride.

In Japanese Patent Application (OPI) No. 112289/1975, published Sept. 3, 1975, there is described a process wherein the titanium trichloride-containing reduced solids product obtained from the low temperature reduction of titanium tetrachloride in the presence of an organoaluminum compound is treated with a complexing agent, e.g., ethers, and then the resulting brown $TiCl_3$-containing catalyst is treated with carbon tetrachloride.

Additionally, in Japanese Patent Application (OPI) No. 143790/1975, published Nov. 19, 1975, a method is described comprising treating the reduced solids product with a mixture of a complexing agent and carbon tetrachloride.

In Japanese Patent Application (OPI) No. 149897/1976, published Dec. 23, 1976 and corresponding to British Pat. No. 1,484,086, there is described a process in which brown titanium trichloride obtained from the reduction of titanium tetrachloride in the presence of an organoaluminum halide and at low temperatures is subjected to heat treatment in the presence of a halogenated aliphatic or aromatic hydrocarbon in order to produce a violet titanium trichloride. It is further disclosed that the brown titanium trichloride obtained from the reduction step may be treated with a complexing agent, including ethers, prior to heat treatment.

In Japanese Patent Application (OPI) No. 227/1977, published Jan. 5, 1977, there is described a process which comprises heat-treating the reduced solid obtained from the low temperature reduction of titanium tetrachloride with an organoaluminum compound, treating the reduced solid with a complexing agent and then treating the resulting solids with an alkylaluminum dihalide or titanium tetrachloride.

Furthermore, in U.S. Pat. No. 3,825,524 there is described a process for the production of titanium trichloride catalyst having a high activity which includes contacting a crude titanium trichloride composition, obtained by reducing titanium tetrachloride with an organoaluminum chloride, with a mixed solvent system composed of (i) a main solvent of aliphatic or aromatic hydrocarbons, aromatic chlorinated hydrocarbons or trichloroethylene, and (ii) an auxilliary solvent, including ethers. The mixed solvent system is employed for the purpose of extracting undesirable components from the reduction product.

In co-pending U.S. Applications Ser. Nos. 774,964, 774,946 and 774,947 there are disclosed processes for the production of titanium trichloride catalyst complexes useful for the polymerization of alpha-olefins in the presence of a co-catalyst such as an organo-metal compound. The process comprises reducing titanium tetrachloride with an organoaluminum halide compound at low temperature and thereafter treating at elevated temperatures the resulting reduced solid product with a chlorinated saturated hydrocarbon and in the further presence of a complexing agent such as an ether.

In Japanese Patent Application Publication No. Sho. 52-142691, of Chisso Corp., published Nov. 28, 1977, there is described a method of producing a titanium halide catalyst component wherein a small amount of propylene is present during the preparation of the titanium trichloride obtained during the reduction of titanium tetrachloride with an organoaluminum compound and thereafter treating the obtained reduced solid with a Lewis acid and/or a complexing agent.

It is well known that during the formation of polyolefin particles obtained in the presence of transition metal halide catalysts, such as titanium halides, the polymer particles are essentially replicates of the catalyst particles. It is further known that during the activation of the titanium halides obtained from the low temperature reduction of titanium tetrachloride that the transition metal halide particles are friable, i.e., they will shear into smaller particles, i.e., fines. Therefore, it is highly desirable to obtain transition metal halide catalyst components which are essentially non-friable during activation and when subjected to mechanical shearing forces which may occur either during activation and polymerization.

SUMMARY OF THE INVENTION

In accordance with the present invention, a non-friable, highly active Ziegler-type titanium chloride catalyst composition is obtained by reducing titanium tetrachloride to a titanium trichloride reduced solid product in the presence of an organoaluminum compound at a low temperature, e.g., in the range of about −50° C. to about 30° C., contacting the titanium trichloride reduced solid product with a minor amount of an alpha-olefin having at least three carbon atoms under polymerization conditions to obtain a titanium trichloride reduced solid product containing about 1 to about 1,000 wt% of prepolymerized alpha-olefin based on the weight of titanium trichloride thereby providing prepolymerized TiCl₃ reduced solid, and thereafter treating said prepolymerized titanium trichloride reduced solid product with one of (a) a chlorinated hydrocarbon having at least two carbon atoms and a Lewis base complexing agent or with (b) a Lewis acid such as TiCl₄ and a Lewis base complexing agent to convert said prepolymerized titanium trichloride reduced solid to a highly active, crystalline prepolymerized titanium trichloride composition. The process of prepolymerizing the titanium trichloride reduced solid product obtained from the low temperature reduction of titanium tetrachloride in the presence of an alkylaluminum compound results in titanium trichloride catalyst particles which are substantially resistant to fractionation, i.e., are non-friable, and therefore, can be readily converted to a purple form of titanium trichloride absent the production of "fines" by treatment of the prepolymerized titanium trichloride reduced solid with the halogenated hydrocarbon and Lewis base or by other methods of activation. The strengthening of the titanium trichloride reduced solid, therefore, allows for a wider range of activation conditions, as well as use of variety of solvents and activators which would normally disintegrate titanium trichloride particles. In other words, the prepolymerization of the titanium trichloride reduced solid product (the contacting of the reduced solid under polymerization conditions with a minor amount of an alpha-olefin) allows the reduction product to be activated under extreme conditions which heretofore would normally lead to catalyst attrition.

DETAILED DESCRIPTION OF THE INVENTION

The titanium trichloride-containing reduced solid used in the present invention is obtained by reducing titanium tetrachloride with an organoaluminum compound and preferably an alkylaluminum halide at low temperature (e.g., −50° C. to +30° C.) as described in patent Application U.S. Ser. No. 774,964 which disclosure is hereby incorporated by reference. The alkylaluminum halide employed can be represented by the general formula $R_nAlX_{3-n}$, wherein R represents an alkyl group having 1 to 18 carbon atoms, most preferably 2 to 6 carbon atoms, X represents a halogen atom, most preferably chloride, and n can be within the range of 0 to 3 and preferably 1 to 3, or a mixture or complex compound thereof. Illustrative of suitable alkylaluminum compounds are trialkylaluminums, dialkylaluminum halides, monoalkylaluminum dihalides and alkylaluminum sesquihalides, mixtures or complex compounds thereof. Examples of trialkylaluminums which can be employed are trimethylaluminum, triethylaluminum and tributylaluminum and the like. Examples of dialkylaluminum halides are dimethylaluminum chloride, diethylaluminum chloride, dibutylaluminum chloride, diethylaluminum bromide and diethylaluminum iodide and the like. Examples of the monoalkylaluminum dihalides are methylaluminum dichloride, ethylaluminum dichloride, butylaluminum dichloride, ethylaluminum dibromide and ethylaluminum diiodide and the like. Examples of the sesquihalides are ethylaluminum sesquichloride, propylaluminum sesquihalide and the like. Triethylaluminum, diethylaluminum chloride, ethylaluminum dichloride, ethylaluminum sesquichloride and mixtures thereof or complex compounds thereof, for example, a mixture of diethylaluminum chloride and ethylaluminum dichloride are particularly preferable.

The reduction step is carried out at a specified temperature which typically is between −50° C. and +30° C. by contacting titanium tetrachloride with the above-described organoaluminum compound. By way of example, to a solution of titanium tetrachloride in an inert solvent or diluent, e.g., a hydrocarbon having 5 to 12 carbon atoms such as n-pentane, isopentane, cyclopentane, n-hexane or isooctane, there is added dropwise a solution of alkylaluminum halide compound in said inert solvent of diluent. Conversely, a solution of titanium tetrachloride can be added dropwise to a solution of the alkylaluminum halide compound. Under carefully controlled conditions, the quantity of organoaluminum compound employed is generally about 0.5 to about 5 gram atoms as aluminum per 1 gram atom of titanium.

The specific temperatures and the amount of organoaluminum compound employed during the reduction step can be varied within the ranges disclosed herein, nevertheless associated with a specific organoaluminum compound there can be desirable concentrations and temperature ranges. In the case of diethylaluminum chloride, for example, (which will hereinafter be referred to as "DEAC") it is preferable to carry out the reduction at a temperature of about −50° C. to about +30° C., particularly about −5° C. to about +5° C., and to use DEAC in a proportion of about 0.5 to about 5 mols, particularly about 0.8 to about 1.5 mols, to 1 mol of titanium tetrachloride. For a mixture or complex of dialkylaluminum halide and alkylaluminum dihalide, for example, DEAC and ethylaluminum dichloride (which will hereinafter be referred to as "EADC"), it is preferable to carry out the reduction at a temperature of about −50° C. to about +30° C., particularly about −5° C. to about +5° C., and to use DEAC in a proportion of about 0.5 to about 4 mols, particularly about 0.8 to about 1.5 mols, and EADC in a proportion of about 0.01 to about 1.5 mols, particularly about 0.1 to about 1.2 mols, respectively based on 1 mol of titanium tetrachloride.

The period of time of reactant addition during the reduction step may vary greatly, depending upon the quantity of reactants used and the desirability of maintaining a specified reduction temperature. However, reactant addition, e.g., dropwise addition, is generally carried out for a period of time of from about 30 minutes to about 3 hours.

Preferably, after reactant addition the reaction mixture is aged in order to complete the reduction reaction. Aging may be carried out by gradually elevating the temperature of the reaction mixture to a specified temperature within the range of about 20° C. to about 100° C. over a period of time of about 1 to 2 hours. Most preferably, aging is carried out by holding the reaction mixture, after reactant addition, at the reduction temperature for about one-half hour and then gradually elevating the temperature to about 65° for a period of time of about 1 hour and finally holding the reaction mixture at about 65° C. for about 1 hour. Caution should be taken during aging to prevent the titanium trichloride reduced solid from being subjected to conversion of the titanium trichloride-containing reduced solid to a more crystalline form. For example, by subjecting the titanium trichloride reduced solid to too high a temperature for a prolonged period of time during the aging step crystal conversion could occur.

The so obtained titanium trichloride reduced solid is an amorphous solid having a complicated composition comprising, as a main component, titanium trichloride and the alkylaluminum compound employed in the reduction, or a reaction product of titanium tetrachloride and the alkylaluminum halide compound. This composition varies depending upon the exact reducing methods and conditions. Where titanium tetrachloride is reduced with a mixture of DEAC and EACD, it comprises, as a main component, titanium trichloride and EADC and, in addition, aluminum compounds in various forms, the proportion of aluminum being about 0.2 gram atoms or more to 1 gram atom of titanium.

The so obtained reduced solid contains titanium trichloride of the beta-type and is brown to red-violet in color, depending upon specific reduction conditions employed.

The titanium trichloride reduced solid obtained as described above can be prepolymerized, i.e., contacted with a polymerizable alpha-olefin under polymerization conditions, directly without the addition of a reducing co-catalyst or it can be separated, washed in an inert solvent or diluent, if desirable, and then prepolymerized upon addition of a co-catalyst (aluminum alkyl) as it is or after drying in a conventional manner.

In accordance with this invention the alpha-olefins which can be employed in the prepolymerization step can have from 3 to 22 and desirably 3 to 8 carbon atoms. However, an alpha-olefin mixture having from 10 to 46 carbon atoms can also be employed. In accordance with a preferred embodiment of the invention, the alpha-olefins will contain no branching on the vinylic carbon atom. Illustrative of alpha-olefins which can be employed in accordance with this invention during the prepolymerization step are propylene, butene-1, pentene-1, hexene-1, heptene-1, 4-methyl-pentene-1 and the like. Preferably the alpha-olefin will contain from 3 to 6 carbon atoms and most preferably the alpha-olefin will be propylene.

The temperature of the reaction mixture during the alpha-olefin application can be from about 0° C. to 100° C. preferably 25° C. to about 60° C. and most preferably from about 30° C. to about 40° C. As in the aging step, prepolymerization conditions should be such as to prevent conversion of the reduced solid to a more crystalline form.

The alpha-olefin employed in accordance with the present invention for the prepolymerization of the titanium trichloride reduced solid can be added directly to the reaction product of the reduction step or it can be added to the washed reaction product in a suitable solvent. The amount of alpha-olefin employed can be in a mol ratio total titanium halide reduced solid employed in a range of about 0.03 to 3000 times, and particularly at about 0.1 to 0.5 times. The mol ratios employed, therefore, will desirably provide a titanium halide prepolymerized with about 1 to 1,000 wt% of alpha-olefin based on the titanium halide and desirably from about 3 to about 100 wt.% and most preferably from about 6 to 30 wt.% of alpha-olefin based on the weight of titanium halide.

The time period over which the alpha-olefin can be allowed to react with the reduced solids is desirably in a range of about 1 minute to about 100 minutes, preferably in a range of 10 to about 120 minutes and most preferably about 30 minutes. The times will be function of the temperatures employed, the alpha-olefins employed as well as the degree of prepolymerization desired. Hence, the actual time employed would be determined by the artisan, the determination being well within the skill of the artisan.

Upon completion of prepolymerization the titanium trichloride reduced solid now prepolymerized with a minor amount of alpha-olefin is filtered and washed with an inert organic solvent so as to remove any reaction by-products.

In accordance with this invention, the prepolymerized titanium trichloride reduced solids obtained will manifest essentially no change in crystalline structure.

The prepolymerized reduced solid can be employed as a non-friable polymerization catalyst component.

The prepolymerized titanium trichloride reduced solid product can, in accordance with a preferred aspect, be activated to a highly active crystalline prepolymerized product in essentially two manners. One can employ a chlorinated hydrocarbon in combination with a Lewis base complexing agent or a Lewis acid in combination with a Lewis base complexing agent. In accordance with this invention it is preferable to employ the chlorinated hydrocarbon in combination with the Lewis base complexing agent.

As illustrative of the chlorinated hydrocarbons which can be employed in accordance with this invention are hexachloroethane, pentachloroethane, tetrachloroethane, trichloroethane, dichloroethane, monochloroethane, tetrachloroethylene, trichloroethylene, dichloroethylene, chloroethylene, octachloropropane, hectachloropropane, hexachloropropane, pentachloropropane, tetrachloropropane, trichloropropane, dichloropropane, monochloropropane, tetrachlorobutane, trichlorobutane, dichlorobutane, trichloropentane, dichloropentane, dichlorohexane, dichloroheptane, dichlorooctane, dichlorobenzene, trichlorobenzene, monochlorobenzene, dichloropropene, trichloropropene, and dichlorobutene.

A variety of chlorinated hydrocarbons can be employed during activation, e.g., the chlorinated products of aliphatic and aromatic hydrocarbons. The chlorinated products of the aliphatic saturated hydrocarbons are generally more effective. Desirably the chlorinated aliphatic hydrocarbons will have from about 2 to 8 carbon atoms and from about 2 to 6 chlorine atoms per molecule. The most preferred chlorinated hydrocarbons are the chlorinated ethanes. The effect of the chlorinated hydrocarbons appears to increase with the increased number of chlorine atoms per molecule desired. Desirably, therefore, the chlorinated hydrocarbons employed can be one of hexachloroethane, pentachloroethane, tetrachloroethane, trichloroethane. Most preferably the chlorinated hydrocarbon will be hexachloroethane.

The Lewis base complexing agent which can be employed in accordance with this invention will desirably contain at least one electron donating atom or group in the molecule and will preferably be one of an ether, ester, ketone, thioether, organophosphoric compound or organonitrogen compound or mixtures of these compounds. Most desirably the Lewis base complexing agent will be a dialkyl ether such as, for example, diethyl ether, diisopropyl ether, di-n-butyl ether, diisobutyl ether, diisoamyl ether, di-2-ethylhexyl ether, di-2-ethylheptyl ether, allyl ethyl ether, allyl butyl ether, diphenyl ether, anisole, phenetole, chloroanisole, bromoanisole, dimethyloxy benzene, and the like.

Useful examples of the thioethers are diethyl thioether, di-n-propyl thioether, dicyclohexyl thioether, diphenyl thioether, ditolyl thioether, ethylphenyl thioether, propylphenyl thioether, diallyl thioether, and the like. Useful examples of the organophosphorous compounds which can be employed in accordance with this invention are tri-n-butyl phosphine, triphenyl phosphine, triethyl phosphite, tributyl phosphite, and the like. Useful examples of the organonitrogen compounds are diethyl amine, triethyl amine, n-propyl amine, di-n-propyl amine, tri-n-propyl amine, aniline, dimethylaniline, and the like. As indicated above, the ethers are most preferably employed and above all are dialkyl ethers, preferably the alkyl groups containing from 4 to 8 carbon atoms. Most preferred are dialkyl ethers containing 4 or 5 carbon atoms. The ethers so employed can be symmetrical or asymmetrical ethers and hence the alkyl groups are selected from the group consisting of n-butyl, isobutyl, n-amyl, isoamyl, 2-methylbutyl and 2-ethylpropyl. Most preferably di-n-butyl ether and diisoamyl ether and n-butyl isoamyl ether are employed in accordance with this invention as a Lewis base complexing agent to be used in combination with the halogenated hydrocarbon.

In accordance with the present invention one may employ a Lewis acid in place of the halogenated hydrocarbon. However, the Lewis acid combination with a Lewis base is less desirable with respect to the results obtained than the halogenated hydrocarbon in combination with a Lewis base. The Lewis acids which can be used are selected from the halides of Group II or Group VII metals and halides of silica or boron. Illustrative of the Lewis acids which can be employed are, for example, $MgCl_2$, $MnCl_4$, $AlCl_3$, $FeCl_3$, $TiCl_4$, $VCl_4$, $VCl_3$, $NiCl_2$, $CoCl_2$, $BCl_3$, $BF_3$, $SiCl_4$. The preferred Lewis acid is $TiCl_4$.

The amount of Lewis acid employed in accordance with this invention can be from about 0.05 to about 50 times that of the weight of the prepolymerized titanium halide and preferably is from about 0.45 to about 15 times.

The proportion of Lewis base complexing agent employed is preferably between 0.1 and 2.5 mols, and especially between 0.5 and 1.8 mols, per mol of $TiCl_3$ present in the reduced solid. About 1 mol Lewis base per mol of $TiCl_3$ present in the reduced solid gives particularly good results.

In accordance with the present invention the activation step, i.e., the conversion of the prepolymerized reduced solid to a highly crystalline form of titanium trichloride is accomplished by contacting the prepolymerized reduced solid with either the chlorinated hydrocarbon and Lewis base complexing agent or the Lewis acid and Lewis base complexing agent. The contacting can be carried out by adding the prepolymerized reduced solid to an inert solvent or diluent, such as previously described so as to prepare a suspension and then adding, for example, the ether and hexachloroethane, thereto in order; by adding the ether to the prepolymerized reduced solid to prepare a suspension and then adding thereto hexachloroethane as a solution of hexachloroethane in the ether or an inert solvent; or by adding the prepolymerized reduced solid to a mixed solution of the ether and hexachloroethane or a mixed solution of ether, hexachloroethane and an inert solvent. The most convenient and favorable method consists in suspending the reduced solid in an inert solvent and then adding a mixture of ether, hexachloroethane and an inert solvent to the suspension.

In accordance with the present invention the chlorinated hydrocarbon such as hexachloroethane and the ether can be in a mol ratio to the titanium halide in the reduced solid of about at least 0.2 mol or more of chlorinated hydrocarbon, preferably 0.1 mol to about 2.5 mols of ether and 0.5 to 1.5 mols of hexachloroethane. Greater or lesser ratios can be employed. However, the most desirable effects are obtained by employing the so stated specific mol ratios.

Moreover, the effects of the present invention are somewhat reduced if the prepolymerized reduced solid is contacted with the hexachloroethane or halogenated hydrocarbon prior to contacting the reduced solid with the ether. The treatment with ether and hexachloroethane appears together to provide a synergistic effect resulting in a catalyst having surprisingly excellent catalytic performances.

In accordance with the present invention the chlorinated hydrocarbon is employed in an amount of about 0.5 mols to about 1.5 mols per gram atom of titanium in the prepolymerized reduced solid and preferably the chlorinated hydrocarbons will be in the range of about 0.2 mols to about 3.0 mols particularly in the range of about 0.6 mols to about 1.2 mols per 1 gram atom of titanium in the prepolymerized reduced solid. Greater amounts of chlorinated hydrocarbon can be employed, however, no benefit is obtained therefrom. Lesser amounts of chlorinated hydrocarbon results in a less active catalyst.

The activation step is carried out at a temperature of about 50° to about 100° C. for a period of time of about 1 to 10 hours. Utilization of temperatures outside these ranges can be employed. However, activity of the catalyst appears to be best when the specified temperatures are employed. Most preferably, activation is carried out with the chlorinated hydrocarbon and ether at a temperature of about 80° C. to about 90° C. for about 3 to about 7 hours. Upon completion of the activation step the so obtained prepolymerized titanium trichloride catalyst composition is separated from the solvent, washed with an inert solvent or diluent and optionally dried in conventional manners. During the treatment step, the titanium halide of the reduced solid is converted whereby the so obtained titanium trichloride catalyst contains predominantly titanium trichloride of the delta-type, according to the classifications generally adopted (Journal of Polymer Science, 51, 1961, pp. 399-410). The so obtained titanium trichloride catalyst has a violet to purple color.

The titanium trichloride catalyst of the present invention is ordinarily employed as a catalyst for the polymerization of alpha-olefins by contacting the same with an organo-metal compound which is used as a cocatalyst for the Ziegler-type catalyst, for example, monoalkylaluminum dichloride, dialkylaluminum monochloride, alkyl aluminum sesquihalide or trialkylaluminum. One may also employ various compounds, for example, complexing agents such as ethers, amines or amides as well as phosphorous-containing compounds and nitrogen. The catalyst system for the polymerization of alpha-olefins employing the prepolymerized titanium trichloride catalyst of the present invention is exceedingly active for the homopolymerization or polymerization of alpha-olefins such as propylene, butene-1, 4-methylpentene-1, ethylene and the like and gives uniform polymer particles and a high degree of stereoregular polymers are used to polymerize propylene, for example, the catalytic activities are somewhat greater than about 2,200 grams of polymer formed per gram of titanium trichloride having at least 95% heptane insolubles content.

By so encapsulating the reduced solids particles in a polymer matrix the particles are strengthened to resist mechanical attrition, to resist particle break-up to fines when subjected to solvents and to resist particle break-up to fines during the activation step. Unexpectedly, the prepolymerization, performed in accordance with this invention does not, cause agglomeration of the catalyst particles but desirably allows the catalyst particles to retain their shape during activation and throughout any further polymerization reactions. These advantages are obtained even when the catalysts are employed in harsh solvents such as toluene.

The invention will be more clearly understood by reference to the following Examples. These Examples illustrate specific embodiments of the present invention and should not be construed to limit the invention in any way.

EXAMPLE 1

Preparation of the Titanium Halide Reduced Solid

This Example is illustrative of methods for preparing the reduced solids.

To a 2000 ml flask equipped with a stirrer and placed in a thermostat-controlled bath at 0° there was placed 700 ml of purified heptane and 250 ml of titanium tetrachloride. To the stirred mixture was added dropwise a mixture of 350 ml of diethylaluminum chloride, 117 ml of ethylaluminum dichloride and 400 ml of purified heptane. The reaction mixture was kept at 0° under constant stirring for a period of 3 hours and then aged for 2 hours at a temperature of 65° C.

The resulting titanium trichloride reduced solid in heptane solution was separated into 2 equal portions. With respect to one portion the titanium trichloride reduced solid was separated from the heptane supernatant and washed with purified heptane and dried at 65° for 30 minutes under reduced pressure. The second portion was neither washed nor separated from the heptane supernatant. A sample of the resulting reduced solid from both portion 1 and 2 were examined by X-ray diffraction spectrum techniques. The spectrum essentially revealed that the reduced solid from an X-ray point of view essentially an amorphous solid which contained $TiCl_3$ of the beta-type.

EXAMPLE 2

Prepolymerization of the Washed Titanium Trichloride Reduced Solids

To a 250 ml glass bottle 18.5 cc of purified heptane there was added 10 gm of the dry $TiCl_3$ reduced solids obtained as described in Example 1 and sufficient $EtAlCl_2$ to provide one-half mol per mol of $TiCl_3$. The bottle was capped with a septum cap. The catalyst slurry was placed in a bath held at a temperature of 50° C. The bottle was purged with nitrogen and thereafter purged of nitrogen by purging with propylene for five minutes. During the purging with propylene the catalyst slurry layer was maintained in a quiescent position. After the propylene purge, propylene is passed through the stirred slurry maintained at a temperature of 25° C. for a time sufficient to provide 10 wt.% of polypropylene based on the weight of $TiCl_3$ present. Upon completion of prepolymerization the catalyst, i.e., prepolymerized reduced solid, was examined on an optical microscope and by X-ray diffraction techniques. The X-ray diffraction study revealed no change in the crystalline structure of the $TiCl_3$ reduced solid. The prepolymerized $TiCl_3$ reduced solid product was subjected to shearing forces by mechanically shearing the catalyst slurry on a microscope slide. It was observed that the catalyst was essentially non-friable.

Additional runs were made employing different cocatalyst and/or different reaction conditions. The prepolymerized reduced solid in each instance was non-friable.

The results of the prepolymerization runs are summarized in Table I.

TABLE I

| | | Prepolymerization Conditions | | | Prepolymerized Color | |
|---|---|---|---|---|---|---|
| Cocatalyst | Mole Ratio Cocatalyst:$TiCl_3$ | Catalyst Concentration[1] | T °C. | P (psig) | Color | Friability±[2] |
| 1. $EtAlCl_2$ | 0.5 | 0.54 | 50 | 1 | red-violet | — |
| 2. $EtAlCl_2$ | 0.5 | 0.54 | 80 | 1 | red-violet | — |

TABLE I-continued

| | Cocatalyst | Mole Ratio Cocatalyst:TiCl₃ | Prepolymerization Conditions Catalyst Concentration[1] | T °C. | P (psig) | Prepolymerized Color Color | Friability±[2] |
|---|---|---|---|---|---|---|---|
| 3. | EtAlCl₂ Et₂AlCl | 0.5 0.5 | 0.54 | 25 | 1 | red-violet | — |
| 4. | EtAlCl₂ Et₂AlCl | 0.5 0.5 | 0.54 | 50 | 1 | red-violet | — |
| 5. | Et₂AlCl | 0.1 | 0.54 | 50 | 1 | red-violet | — |
| 6. | Et₂AlCl | 1.0 | 0.54 | 25 | 1 | red-violet | — |
| 7. | Et₃Al | 0.1 | 0.54 | 25 | 1 | dark red-violet | — |
| 8. | Et₃Al | 0.5 | 0.54 | 25 | 1 | dark red-violet | — |

[1] gms/cc in heptane
[2] + friable
— non-friable

EXAMPLE 3

Prepolymerization of the Slurried Titanium Trichloride Reduced Solid

To a 250 ml glass bottle was added 18.5 cc of reduced solid slurry prepared in Example 1 (second portion) containing 0.54 gm reduced solids per cc of slurry. Because the slurry obtained from the reduction step (Example 1) is employed there is no need to add a cocatalyst for the prepolymerization step. To the bottle was added a magnet and the bottle was capped with a septum cap. The bottle is inserted in a water bath maintained at a temperature of 25° C. The bottle is nitrogen purged and thereafter purged with propylene. Propylene was then passed through the constantly stirred slurry for a time sufficient to provide 10 wt.% of polypropylene based on the weight of TiCl₃ present. Upon completion of the prepolymerization the catalyst, i.e., prepolymerized reduced solids was examined on an optical microscope and by X-ray diffraction techniques. The X-ray diffraction study revealed no change in the crystalline structure of the TiCl₃ reduced solids and the solids when subjected to mechanical shearing such as with a glass slide did not fracture, i.e., was non-friable.

Additional runs (10–22) under varied conditions and/or alpha-olefins were made employing the reduced solids obtained from Example 1.

TABLE II

| | Prepolymerization Conditions Catalyst Concentration[1] | T °C. | P (psig) | Olefin Prepolymerized | Wt. % Prepolymerized Olefin | Prepolymerized Color Color | Friability±[2] |
|---|---|---|---|---|---|---|---|
| 9. | 0.54 | 25 | 1 | Propylene | 10 | red-violet | — |
| 10. | 0.54 | 25 | 1 | Propylene | 10 | red-violet | — |
| 11. | 0.54 | 25 | 1 | Propylene | 10 | red-violet | — |
| 12. | 1.08 | 25 | 1 | Propylene | 10 | red-violet | — |
| 13. | 0.10 | 25 | 1 | Propylene | 10 | red-violet | — |
| 14. | 0.54 | 40 | 1 | Propylene | 10 | red-violet | — |
| 15. | 0.54 | 80 | 1 | Propylene | 10 | red-violet | — |
| 16. | 0.54 | 25 | 10 | Propylene | 10 | red-violet | — |
| 17. | 0.54 | 25 | 100 | Propylene | 10 | red-violet | — |
| 18. | 0.54 | 25 | 25 | Propylene | 10 | red-violet | — |
| 19. | 0.54 | 25 | 50 | Propylene | 10 | red-violet | — |
| 20. | 0.54 | 50 | 1 | Butene-1 | 10 | red-violet | — |
| 21. | 0.54 | 50 | 1 | 4-Methylpentene-1 | 10 | red-violet | — |
| 22. | 0.54 | 50 | 1 | Octene-1 | 10 | red-violet | — |
| 23. | 0.54 | 25 | — | Propylene Butene-1 | 10 | red-violet | — |
| 24. | 0.54 | 25 | 1 | Propylene | 3 | dark red-violet | ± |
| 25. | 0.54 | 25 | 1 | Propylene | 8 | red-violet | — |
| 26. | 0.54 | 25 | 1 | Propylene | 15 | red-violet | — |
| 27. | 0.54 | 25 | 1 | Propylene | 25 | light red-violet | — |
| 28. | 0.54 | 25 | 1 | Propylene | 100 | light red-violet | — |
| 29. | 0.54 | 25 | 1 | Propylene | 400 | light red-violet | — |

[1] gms/cc in heptane
[2] + friable
— non-friable

EXAMPLE 4

Activation of the Prepolymerized TiCl₃ Reduced Solids

The following illustrates that the prepolymerized titanium trichloride reduced solids can be activated to a highly crystalline purple type titanium trichloride.

To a 250 ml glass bottle containing a stirring mechanism there was added 5 gm of prepolymerized reduced solid prepared in accordance with Example 2 (run 9). Thereafter 33.3 ml of a 1.75 molar hexachloroethane solution in heptane is added to the glass bottle. The mixture is shaken and heated to 60° C. To the heated mixture there is added 2.95 cc of 100% n-butyl ether. The slurry is heated to 80° C. and held at the temperature for 5 hours. At the conclusion of this treatment the prepolymerized TiCl₃ was purple in color. The slurry is cooled and the solid particles separated from the supernatant liquid. The solid was washed in 50 ml of boiling heptane and thereafter examined under a microscope and by electron microscopy. The prepolymerized TiCl₃ was now crystalline and was absent catalyst fines. The TiCl3 was resistant to shear on a microscope slide.

EXAMPLE 5

A prepolymerized crystalline TiCl3 was prepared in exactly the same manner as described in Example 4 with the exception that toluene was substituted for heptane. The obtained purple (red-violet) product was examined under a microscope to determine its resistance to shearing. No evidence of shearing was found. No production of fines were evident although toluene was employed as the solvent.

EXAMPLE 6

Comparative Illustration

A reduced solid prepared as in Example 1 was examined under a microscope. This catalyst showed substantially no resistance to mechanical shearing forces in that the catalyst particles broke up into fines when subjected to pressure from a slide. The fines were screened out and the remaining reduced solids activated in the manner described in Example 4. An abundance of TiCl3 fines were produced during this activation step.

EXAMPLE 7

Activation of Prepolymerized Titanium Halide Reduced Solids

To a 250 ml glass bottle there was added 5 gm of prepolymerized reduced solid as prepared in accordance with Example 2 (run 9). To the bottle was added 80 ml of heptane, 6.18 ml of 100% titanium tetrachloride and 4.22 ml of n-butyl ether. The reaction mixture was heated to 65° C. and held at that temperature for 2 hours. The catalyst turned purple in color. The catalyst particles are separated from the solvent and washed with boiling heptane. Upon examination under the microscope and X-ray diffraction the catalyst was noted to be crystalline and resistant to mechanical shearing forces.

EXAMPLE 8

The following runs illustrate that the prepolymerized activated TiCl3 reduced solids catalyst component is an improved catalyst component as compared with activated TiCl3 catalyst component which has not been prepolymerized in accordance with this invention. 100 mg (based on the weight of titanium trichloride) of the titanium trichloride catalyst component prepared according to Example 4 and diethylaluminum chloride in a proportion of 4 mols to 1 gm atom of titanium were charged into a 1000 ml autoclave. 600 ml of hydrogen and 800 ml of liquid propylene were introduced into the autoclave. The contents were heated to 68° C. and allowed to react for a period of 30 minutes. The unreacted propylene was removed and the separated polymer was washed. As a comparison, 100 mg of a reduced solid prepared in accordance with Example 1 and thereafter activated by treating with 33.3 ml of a 1.75 molar hexachloroethane solution in heptane and n-butyl ether as described in Example 4 was substituted for the prepolymerized activated TiCl3 above. Propylene was polymerized under otherwise identical conditions.

As a further comparison a titanium trichloride prepared according to Example 5 was employed for the polymerization of propylene.

Results of this Example and the comparisons are summarized in Table III.

TABLE III

| Prepolymerization of TiCl3 Reduced Solid | Solvent | Presence of Catalyst "fines" | Polymer Particles Cat. Eff., W/W | Heptane = Insol. % |
|---|---|---|---|---|
| No | Heptane | Yes | 147 | 95.6 |
| Yes | Heptane | No | 120 | 97.6 |
| Yes | Toluene | No | 120 | >95 |

EXAMPLE 9

The following Examples illustrate that the titanium trichloride reduced solid can be prepolymerized with monomers other than propylene. In accordance with this invention titanium trichloride reduced solid as prepared in Example 1 was prepolymerized with a monomer or mixture of monomers as listed in Table IV. The prepolymerized reduced solid was activated as described in Example 4.

Polypropylene was polymerized in the presence of the activated prepolymerized TiCl3 catalyst in a manner as described in Example 8. The results are summarized in Table IV, where absence of catalyst dumping is a measure of the effectiveness of catalyst strengthening by monomer, i.e., absence of polymer fines.

TABLE IV

| Example | Monomer | mmols | mmols Monomer mmol TiCl3 | gms Polymer Mol TiCl3 | Catalyst Clumping |
|---|---|---|---|---|---|
| A. | Propylene | 48 | 20 | 8813 | No |
| B. | Butene-1 | 53 | 20 | 9806 | No |
| C. | Pentene-1 | 42 | 17.3 | 6769 | No |
| D. | Hexene-1 | 50 | 20 | 9449 | No |
| E. | Octene-1 | 51 | 20 | 8000 | No |
| F. | (C22–C46)-1[a] | 121 | 45.8 | 3752 | No |
| G. | Isobutene | 55 | 20 | 1872 | Yes |
| H. | 3-me-butene-1 | 51 | 20 | 2360 | Partial |
| I. | 4-me-pentene-1 | 50 | 20 | 4427 | No |
| J. | Cis-butene-2 | 51 | 20 | 2360 | Yes |
| K. | Cyclopentene | 50 | 20 | 1183 | Yes |
| L. | Butadiene-1,3 | 48 | 20 | 2233 | Yes |
| M. | Acetylene | 19.7 | 7.04 | 953 | Yes |

[a] A mixture containing all alpha-olefins within the indicated range.

EXAMPLE 10

To a 0.1 gallon reactor are added 57.4 grams of TiCl4 and 0.015 gallons of normal hexane. The stirred solution is cooled to 0° C. and 66.9 grams of DEAC solution (60 wt.% in normal hexane) is added over a five hour period. At the completion of DEAC addition, the stirred reaction mixture is held at 0° C. for 30 minutes, then warmed to 65° C. at 1° C. per minute and held at 65° C. for 1 hour. The stirred mixture is cooled to 35° C., and propylene is fed into the reaction mixture, at a rate of 0.31 grams per minute until 6.13 grams of propylene have been added. The reaction vessel is purged with nitrogen to remove all propylene from the solvent and vessel. The reaction mixture is washed by stirring with 0.6 gallons of hexane for 15 minutes, and by decanting hexane supernatant wash from settled catalyst slurry. The prepolymerized solids were examined.

To the prepolymerized reduced solid slurry there is added 0.003 gallons of hexane, and while stirring the slurry is heated to 60° C. Thereafter, a hot (55° C.) solution of 59 grams of hexachloroethane, 41.3 grams di-n-butyl ether and 0.16 gallons of normal hexane are added to the slurry over a period of 0.5 hours. The stirred reaction mixture is heated to 85° C. and held between 83° and 87° C. for five hours.

The reaction mixture is cooled to 65° C. and 0.07 gallons of hexane are added and the mixture stirred for 15 minutes. The hexane is decanted from settled catalyst slurry and the slurry is washed in hexane.

A comparison of the properties of the thus prepared catalysts components are given in Table V below.

TABLE V

| Catalyst | Color | Friability | Particle Diameter | Al:Ti:PP$^3$ Mole Ratio |
|---|---|---|---|---|
| reduced solid | brown to red-violet | Yes | 30 | 0.4:1:0 |
| prepolymerized reduced solid | pink to red-violet | No | 32–35 | 0.4:1:0.3 |
| Prepolymerized Activated Solid | purple | No | 32–35 | 0.03:1:0.3 |

What is claimed is:

1. An essentially non-friable, prepolymerized, beta-type TiCl$_3$ catalyst component composition capable of being crystal converted to a highly active catalyst component obtained by:
   (a) reducing TiCl$_4$ in an inert diluent to a beta-type TiCl$_3$ reduced solid product in the presence of an organoaluminum compound at a temperature in the range of about −50° C. to about +30° C., and
   (b) contacting the TiCl$_3$ reduced solid product with one or more α-olefins having from 3 to 8 carbon atoms in an amount sufficient to obtain a reduced TiCl$_3$ solid product prepolymerized with about 1 to about 1000 wt.% of said α-olefin based on the weight of TiCl$_3$.

2. A TiCl$_3$ reduced amorphous solid composition comprising TiCl$_3$ of the beta-type and an alkylaluminum compound and being brown to red-violet in color prepolymerized with about 1 to 1000 wt.% based on the weight of TiCl$_3$ of an α-olefin having from 3 to 8 carbon atoms.

3. The catalyst component of claim 1 wherein the reduced solid obtained in step (a) is separated from the diluent and thereafter, in the presence of a cocatalyst, contacted under polymerization conditions with one or more α-olefins having from 3 to 8 carbon atoms in an amount sufficient to obtain a reduced TiCl$_3$ solid product prepolymerized with about 1 to 1000 wt.% of said α-olefin based on the weight of TiCl$_3$.

4. The TiCl$_3$ reduced amorphous solid of claim 2 prepolymerized with said α-olefin in an amount of about 3 wt.% to about 100 wt.% based on the weight of TiCl$_3$.

5. The TiCl$_3$ reduced amorphous solid of claim 2 prepolymerized with said α-olefin in an amount of about 6 wt.% to about 30 wt.% based on the weight of TiCl$_3$.

6. The TiCl$_3$ reduced amorphous solid of claim 2 wherein the α-olefin is propylene.

* * * * *